US008889771B2

(12) United States Patent
Dufaure et al.

(10) Patent No.: US 8,889,771 B2
(45) Date of Patent: Nov. 18, 2014

(54) USE OF MOLECULES CARRYING ASSOCIATIVE GROUPS AS PLASTICISERS

(75) Inventors: Nicolas Dufaure, Bernay (FR); Jean-Luc Couturier, Lyons (FR); Manuel Hidalgo, Brignais (FR)

(73) Assignee: Arkema France, Colombes (FR)

( * ) Notice: Subject to any disclaimer, the term of this patent is extended or adjusted under 35 U.S.C. 154(b) by 75 days.

(21) Appl. No.: 13/643,867

(22) PCT Filed: Apr. 18, 2011

(86) PCT No.: PCT/FR2011/050878
§ 371 (c)(1),
(2), (4) Date: Jan. 4, 2013

(87) PCT Pub. No.: WO2011/135228
PCT Pub. Date: Nov. 3, 2011

(65) Prior Publication Data
US 2013/0203944 A1    Aug. 8, 2013

(30) Foreign Application Priority Data

Apr. 27, 2010 (FR) ..................................... 10 53210

(51) Int. Cl.
*C08K 5/3445* (2006.01)
*C08K 5/435* (2006.01)
*C08K 5/34* (2006.01)
*C08F 26/06* (2006.01)
*C08L 79/04* (2006.01)
*C08L 101/02* (2006.01)

(52) U.S. Cl.
CPC .............. *C08L 79/04* (2013.01); *C08L 101/025* (2013.01); *C08K 5/34* (2013.01); *C08F 26/06* (2013.01)
USPC ....................... 524/106; 525/420.5; 548/323.5

(58) Field of Classification Search
CPC ... C08L 101/025; C08L 79/04; C08L 5/3445; C08L 5/435; C08F 26/06
USPC ....................... 525/420.5; 524/106; 548/323.5
See application file for complete search history.

(56) References Cited

U.S. PATENT DOCUMENTS

| 3,420,837 | A | * | 1/1969 | Magne et al. ................. 546/226 |
| 5,188,745 | A | * | 2/1993 | Migdal et al. ................ 508/255 |
| 7,312,263 | B2 | | 12/2007 | Schmid et al. |
| 2008/0221272 | A1 | * | 9/2008 | Tournilhac et al. ........... 525/194 |
| 2010/0135940 | A1 | * | 6/2010 | Grimaldi et al. ................ 424/62 |
| 2011/0135859 | A1 | | 6/2011 | Tournilhac et al. |

FOREIGN PATENT DOCUMENTS

| EP | 564967 A1 * | 10/1993 |
| EP | 0 584 967 | 3/1994 |
| EP | 0 743 305 | 11/1996 |
| EP | 1 550 696 | 7/2005 |
| WO | WO 2006/016041 | 2/2006 |
| WO | WO 2008/029065 | 3/2008 |

OTHER PUBLICATIONS

International Search Report for PCT International Application No. PCT/FR2011/050878 dated Sep. 26, 2011.
International Search Report for PCT International Application No. PCT/FR2011/050877 dated Apr. 11, 2011.
Office action for U.S. Appl. No. 13/643,831 dated Jan. 4, 2013,.

* cited by examiner

*Primary Examiner* — Michael M Bernshteyn
(74) *Attorney, Agent, or Firm* — RatnerPrestia

(57) ABSTRACT

The invention relates to the field of plasticizers, compounds used as additives in polymers for facilitating the transformation thereof or modifying the mechanical properties thereof especially rigidity.

10 Claims, No Drawings

USE OF MOLECULES CARRYING ASSOCIATIVE GROUPS AS PLASTICISERS

This is a U.S. National Phase application of International Application No. PCT/FR2011/050878, filed Apr. 18, 2011, which claims priority benefit of FR 1053210, filed Apr. 27, 2010, both of which are incorporated herein by reference in their entirety for all purposes.

FIELD OF THE INVENTION

The present invention relates to the field of plasticizers, compounds used as additives in polymers for facilitating their transformation or modifying their mechanical properties, especially their rigidity.

BACKGROUND OF THE INVENTION

Many drawbacks are associated with the use of plasticizers. Among these drawbacks, mention may be made of:
  their tendency to migrate toward the surface or the interfaces of manufactured articles based on polymer formulations containing them or toward liquids that may be in contact with such articles, and
  their volatility.

These two migration and volatility mechanisms have the undesirable consequence of degrading the properties of the polymer formulation by loss of plasticizer, and also of releasing into the environment organic compounds, which are sometimes toxic.

There is thus an ongoing need for novel plasticizers which are of lower volatility and/or have a lesser tendency toward migration than standard plasticizers.

SUMMARY OF THE INVENTION

One subject of the invention is thus the use as plasticizer in a plastic of a molecule with an average molecular mass of greater than 500 g/mol, bearing at least one associative group comprising a nitrogenous heterocycle.

DETAILED DESCRIPTION OF THE INVENTION

For the purposes of the present invention, the term "plasticizer" means a compound corresponding to one and advantageously to two, three or all of the following definitions:
  (1) it is a product that satisfies the definition given in standard ASTM D883, entitled "Plastics Nomenclature" published by the *American Society for Testing of Materials, Philadelphia, Pa.;*
  (2) it is a compound which, when added to a plastic or elastic polymer, is capable of modifying its flexibility, processability, stretchability, viscosity or mechanical strength;
  (3) it is a compound which, when added to a polymer, reduces its viscosity, hardness, mechanical modulus, energy required for formulation or processing, heat of mixing during processing, by increasing the elongation at break, flexibility, breaking energy (strength) or mechanical fatigue strength;
  (4) it is a compound which, when added to a polymer, modifies its glass transition temperature and in particular lowers the glass transition temperature of a polymer by at least 2° C., at least 3° C. or at least 4° C., and advantageously at least 5° C. when it is added in sufficient amounts. The lowering of the glass transition temperature is a function of the amount of plasticizer in the composition. This amount should be such that it is sufficient to bring about a reduction or an effective lowering of the glass transition temperature of the polymer.

Advantageously, the term "plasticizer" means a compound that satisfies definition (4) above.

The glass transition temperature, or Tg, is a property associated with amorphous polymers and semicrystalline polymers (due to the existence therein of an amorphous part). The Tg of a polymer may be measured via various techniques that are capable of detecting a large change in a property on passing through the Tg, for instance dilatometry or calorimetry, due to the changes in specific volume or in heat capacity associated with the passage of the system through its Tg. Among the other properties that enable the Tg to be detected are also the refraction index, the stiffness (expressed in the form of hardness, mechanical moduli, etc). Since the Tg is associated physically with the molecular mobility, techniques that are capable of reflecting phenomena associated with this mobility, such as dielectric spectroscopy, nuclear magnetic resonance, dynamic mechanical analysis, etc. may also be used to detect the Tg.

The Tg is measured by applying to the sample (and optionally to the reference, as in differential calorimetry) an ascending or descending temperature ramp.

In the context of the invention, the glass transition temperature of the polymer is measured either by calorimetry or by dynamic mechanical analysis. Thus, a compound is a plasticizer according to one of the preferred modes of the invention when one or both of the measuring methods reveal a lowering of the Tg of the polymer by at least 2° C., at least 3° C. or at least 4° C., and advantageously at least 5° C. when it is added in sufficient amount.

The calorimetry measurement is performed using a differential scanning calorimeter, for example the calorimeter sold under the name MDSC 2920 or under the name Q2000 by the company TA Instruments, via the technique of calorimetric analysis with power compensation or differential scanning calorimetry (DSC). Calorimetry makes it possible to measure the energy difference necessary to maintain at the same temperature, during the test, a sample of the product and a reference cell containing only air. Tests may be performed with this apparatus in isothermal regime or in temperature ramp regime. For Tg measurements, an ascending or descending temperature ramp, set at a rate of 10 or 20° C./min, is applied. The Tg is measured in the glass transition zone, either at the first point of inflexion of the ascending-ramp DSC signal, or at the central point of the transition.

To evaluate the lowering of the glass transition temperature brought about by the plasticizing compound, the glass transition temperature of the polymer is measured to begin with via one of the methods described above, and a mixture of the polymer and of the compound is then prepared and the measurement is taken via the same method and under the same conditions.

The dynamic mechanical analysis is performed according to the method detailed below. The sample not comprising any plasticizing compound and the sample comprising the same are also compared by conducting measurements under the same conditions. The signals given by the dynamic mechanical analysis are the complex modulus, $M^*$, the real and imaginary parts, $M'$ and $M''$, respectively, of the complex modulus, and the tangent delta, defined as the ratio $M''/M'$. Once the glass transition zone has been identified, the Tg value is taken, by convention, either at the maximum of the $M''$ signal, or at the maximum of the tangent delta signal, or at the first point of inflexion of the $M'$ or $M^*$ signal. It is accepted that the value obtained at the $M''$ maximum in dynamic mechanical analysis is in good agreement with the Tg value obtained by calorimetry at the first point of inflexion of the DSC signal in ascending ramp at a rate of 10° C./min;

(5) it is a product which, when added to a polymer, reduces the elastic modulus at a given temperature. More precisely, the plasticizer reduces the Young's elastic modulus, E, or the shear modulus, G, at a given temperature or within a given temperature range. The temperature range at which this reduction in the modulus takes place relative to the modulus of the unplasticized product is a range of interest for the applications of the material. Advantageously, the temperature range at which the modulus of the modified material is decreased is a range from −50° C. to 250° C. The measurements of the modulus as a function of the temperature may be performed via various measuring tests or equipment such as small-spraying or large-spraying mechanical tests.

The Young's elastic modulus measurements as a function of the temperature, which make it possible to determine whether a compound is a plasticizer according to the invention, are performed via small-spraying mechanical tests, using a dynamic mechanical analysis machine or DMA, for instance the DMA Q800 machine from the company TA Instruments.

The principle of dynamic mechanical analysis is the periodic stressing of the sample, whose response to this stress is also periodic and more or less shifted over time. For essentially elastic materials, this shift is virtually zero, whereas for materials with viscoelastic behavior (which are very characteristic of polymer systems), this shift is significant and proportional to the viscoelastic nature. The tests are performed, in general, by applying a sinusoidal constraint (stress) generating a sinusoidal strain (response). The two signals are, therefore, more or less shifted (phase shift). The stress is chosen so as to bring about a strain that is small enough to remain within the field of study of linear viscoelasticity in which stress and strain are linked via a parameter that is independent of the applied stress, the dynamic modulus.

During small-amplitude periodic strain, work is applied to the sample. Over a strain cycle, part of this work is reversibly stored in the sample. The rest of the work is irreversibly transformed into heat by the molecular movements. The reversible part of the work is proportional to the mechanical storage modulus, the irreversible part is proportional to the mechanical loss modulus. These two magnitudes may be represented, respectively, as the real (M') and imaginary (M") parts of the complex dynamic modulus, M*. When tests are performed in tension or flexure, this is referred to as the dynamic Young's modulus ($E^*=E'-iE''$), and when tests are performed in shear or torsion, this is referred to as the dynamic shear modulus ($G^*=G'+iG''$). The phase angle ($\delta$) between the stress and the strain appears as a consequence of the dissipation of energy (viscoelasticity). The loss factor $\delta=E''/E'$ (or $G''/G'$) measures the relative loss of energy.

The DMA Q800 machine (TA Instruments) takes measurements with sinusoidal strains in the linear range at constant frequency, for example of 1.0 Hz. The E*, E', E" and tan δ measurements are taken as a function of the temperature to demonstrate the differences of modulus between a pure polymer without plasticizer and the polymer supplemented with plasticizer. More specifically, monitoring of the complex modulus, E*, or of the real part, E', is used to demonstrate the plasticizing effect (reduction of the modulus relative to the modulus of the unplasticized polymer) within the temperature range of interest. The ramp rate for the temperature variation is controlled and is 1° C./min, 2° C./min or 3° C./min.

For the purposes of the present invention, the term "bearing" means that the molecule and the associative groups are attached via one or more covalent bonds.

The term "associative groups" means groups that are capable of associating together via hydrogen bonds, ionic bonds and/or hydrophobic bonds. According to one preferred embodiment of the invention, they are groups that are capable of associating via hydrogen bonds, comprising a dinitrogen or trinitrogen heterocycle generally of 5 or 6 atoms, advantageously a dinitrogen heterocycle, and comprising at least one carbonyl function.

When the associative groups are capable of associating via hydrogen bonds, each associative group comprises at least one donor site and one acceptor site for hydrogen bonding, such that two identical associative groups are self-complementary and can combine together to form at least two hydrogen bonds.

Advantageously, the molecule bearing an associative group has an average molecular mass of greater than 600 g/mol and advantageously greater than 700 or 1000 g/mol.

Advantageously, the molecule bearing at least one associative group is in the form of a supramolecular polymer comprising molecules linked in a network via reversible physical bonds and/or in the form of a hybrid network comprising molecules linked in a network both via reversible physical bonds and via covalent bonds.

The molecule bearing at least one associative group is a supramolecular polymer that may be obtained by reacting at least one compound that is at least bifunctional (A) bearing first and second functions with: at least one compound (B) bearing, firstly, at least one reactive group that is capable of reacting with the first functions and optionally with the second functions of (A) and, secondly, at least one associative group.

"Supramolecular" materials are materials comprising compounds that are associated via noncovalent bonds, such as hydrogen bonds, ionic bonds and/or hydrophobic bonds. An advantage of these materials is that these physical bonds are reversible, especially under the influence of the temperature or via the action of a selective solvent.

The inventors have shown in the examples of the present application that the molecules bearing associative groups according to the invention show less migration and less volatility than the usual plasticizers, while at the same time having excellent efficacy as regards plasticization.

By way of preamble, it will be noted that the term "between" should be interpreted in the present description as including the quoted limits.

Plastics

Among the plastics that may be plasticized with the molecule bearing associative groups, mention may be made of cellulose derivatives such as cellulose acetate, cellulose acetate-butyrate, cellulose nitrate, ethyl cellulose, polyamides such as the homopolymers and copolymers obtained by polymerization of lactam monomers (especially caprolactam or lauryllactam) and/or of α,ω-aminocarboxylic acid (such as 11-aminoundecanoic acid or 12-aminododecanoic acid), polymers consisting of monomers obtained by reaction of a C6-C14 aliphatic, cycloaliphatic or aromatic dicarboxylic acid (such as adipic acid, sebacic acid and n-dodecanedioc acid) with a C6-C22 aliphatic, cycloaliphatic or arylaliphatic diamine (such as hexamethylenediamine, m-xylylenediamine or p-xylylenediamine), copolymers containing monomers of the two families of polyamides mentioned previously, acrylic homopolymers and copolymers such as polymethyl methacrylate and copolymer thereof, polycarbonate, styrene polymers such as polystyrene, polyesters such as polyethylene terephthalate (PET), polybutylene terephthalate (PBT), halogenated vinyl polymers such as polyvinyl chloride (PVC), polyvinyl fluoride, polyvinylidene chloride, polyvinylidene chloride (PVDF), acrylonitrile copolymers, polyethers and polymers of plant or bacterial origin such as poly (lactic acid) or polyhydroxyalkanoates, polyvinyl acetate and polyvinyl butyral.

The plastic may also be an elastomer, and in particular an elastomer chosen from rubber (or elastomeric) polymers having one or more glass transition temperatures lower than their working temperature, in other words materials that are relatively supple at the working temperature having at least one property typical of rubbery elasticity, such as elastic return after large strains (typically greater than 100%), isochoric or constant-volume strain reflected by a Poisson's ratio close to the value 0.5 or a tensile curve typical of an elastomer, as may be found in the literature such as in the book Mécanique de matériaux polymers [Polymer mechanics] by J. L. Halary, F. Laupretre and L. Monnerie, published by Belin, Echelles collection c. 2008 (for example in chapters 1 and 13). A person skilled in the art knows these properties under names such as hyperelasticity, rubbery elasticity or entropic elasticity. Such materials advantageously have a Young's modulus, measured at the working temperature, of between 1000 Pa and 100 000 000 Pa, and advantageously between 50 000 Pa and 50 000 000 Pa. They also have breaking strains of greater than 20% and advantageously greater than 100%.

Advantageously, the elastomers used in the present invention have the property of being able to be subjected to a uniaxial strain at the blocking temperature, for example at room temperature, of at least 20%, for example for 15 minutes, and of recovering, once this strain is released, the essence of their initial dimension, for example with a ruminant strain of less than 10% of its initial dimension.

These elastomers are either of natural origin such as the elastomeric polymer materials derived from the exploitation of natural latex, or of synthetic origin such as the polymers and copolymers obtained by chain, catalytic or stepwise polymerization, involving a majority of monomers of relatively low molecular mass, typically less than 400 g/mol, or even less than 300 g/mol. Both the elastomers obtained from natural latex and synthetic elastomeric polymers may also be chemically modified via functionalization reactions on the preformed polymer chains. Thus, for example, halogenated elastomers may be obtained by total or partial halogenation of the double bonds still present in the polymer chains. Similarly, certain hydrogenated elastomers are obtained via partial or total hydrogenation reactions of these remaining double bonds.

Among the elastomers, nonlimiting examples that may be mentioned include natural rubber, polybutadiene, synthetic polyisoprene, polychloroprene and hydrogenated versions thereof, polyisobutylene, copolymers containing polybutadiene and isoprene blocks with styrene, and also the hydrogenated versions thereof such as poly(styrene-b-butadiene) (SB), poly(styrene-b-butadiene-b-styrene) (SBS), poly(styrene-b-isoprene-b-styrene) (SIS), poly(styrene-b-(isoprene-stat-butadiene)-b-styrene) or poly(styrene-b-isoprene-b-butadiene-b-styrene) (SIBS), hydrogenated SBS (SEBS), poly(styrene-b-butadiene-b-methyl methacrylate) (SBM), and also the hydrogenated version thereof (SEBM), poly(methyl methacrylate-b-butyl acrylate-b-methyl methacrylate) (MAM), poly(styrene-b-butyl acrylate-b-styrene) (SAS), statistical copolymers of butadiene with styrene (SBR) and acrylonitrile (NBR) and the hydrogenated versions thereof, butyl or halogenated rubbers, polyethylenes, polypropylenes, silicone elastomers of general formula —(Si(R)(CH3)—O)$_n$— with CH3 and R linked to the silicon atom and the silicon linked to the oxygen atom, and R possibly being a methyl, phenyl, vinyl, trifluoropropyl or 2-cyanoethyl radical, ethylene-vinyl alcohol copolymers, ethylene-propylene and ethylene-propylene-diene copolymers, copolymers of ethylene with acrylic and vinyl monomers such as copolymers of ethylene and vinyl acetate, available from the company ARKEMA under the trade name Evatane®, copolymers of ethylene, vinyl acetate and maleic anhydride, available from the company ARKEMA under the trade name Orevac®, copolymers of ethylene and of acrylic ester, available from the company ARKEMA under the trade name Lotryl®, copolymers of ethylene, acrylic ester and maleic anhydride, available from the company ARKEMA under the trade name Lotader®, copolymers of ethylene, acrylic ester, functional acrylic ester such as glycidyl acrylate or methacrylate, available from the company ARKEMA under the trade name Lotader®, supple acrylic polymer or copolymers such as resins based on methacrylic esters, such as polybutyl acrylate and copolymers thereof with styrene, or other acrylic or vinyl monomers, polyamide/polyether multiblock copolymers such as those available from the company ARKEMA under the name Pebax®, elastomers based on polyesters and polyurethane (PUR), recycled rubbers based on thermoplastic elastomers or based on recycled crosslinked rubber, such as the product derived from the recycling of tires, and also mixtures thereof.

The elastomer may comprise one or more crosslinked or noncrosslinked elastomers, which are virgin or derived from one or more recycling operations.

In one embodiment of the invention, the elastomer comprises or consists exclusively of recycled elastomeric polymers, either thermoplastic polymers or recycled crosslinked rubber.

Supramolecular Polymers

The reagents used for the manufacture of the supramolecular materials used in the uses according to the invention will now be described in detail.

The supramolecular polymer may be obtained by reaction of at least one at least bifunctional compound (A) bearing first and second functions with:

at least one compound (B) bearing, firstly, at least one reactive group that is capable of reacting with the first and optionally with the second functions of (A) and, secondly, at least one associative group.

The term "associative groups" means groups that are capable of combining together via hydrogen bonds, advantageously via 1 to 6 hydrogen bonds. Examples of associative groups that may be used are imidazolidinyl, triazolyl, triazinyl, bis-ureyl and ureido-pyrimidyl groups.

The term "reactive groups" or "functions" means chemical functions that are capable of reacting with other chemical functions to form covalent bonds, leading especially to the formation of ester, thioester, amide, urea or urethane bridges and in particular ester and amide bridges.

The associative group(s) of compound (B) and the reactive groups or functions thereof may be connected together via a linear or branched C1-C24 and advantageously C1-C10 alkylene chain optionally interrupted with one or more nitrogen atoms, more preferentially a linear C1-C6 alkylene chain.

The term "bifunctional" compound denotes a compound bearing two identical or different reactive functions. An "at least trifunctional" compound denotes a compound bearing at least three identical or different reactive functions.

Advantageously, compound (A) represents more than 50% by mass relative to the total mass of the supramolecular polymer.

Compound (A) used in the first step of the process for synthesizing the supramolecular polymer may in particular bear at least two identical or different functions chosen from acid, ester and acyl chloride functions. It advantageously comprises from 5 to 100, advantageously from 12 to 100 and more preferentially from 24 to 90 carbon atoms.

Compound (A) may be in the form of a mixture of bifunctional compounds and of mono- and/or polyfunctional compounds, such as monoacids and polyacids, in particular tri-, tetra- or penta-acids, or such as fatty acid monomers and fatty acid oligomers derived from at least three fatty acid monomer units, for example fatty acid tetramers, pentamers, etc.

It is preferred to use according to the invention as compound (A) mixtures of dimers (oligomers of two identical or different monomers) and trimers of fatty acids of plant origin which may or may not contain minor amounts of higher fatty acid monomers and oligomers. These compounds result from the oligomerization of unsaturated fatty acids such as undecylenic acid, myristoleic acid, palmitoleic acid, oleic acid, linoleic acid, linolenic acid, ricinoleic acid, eicosenoic acid and docosenoic acid, which are usually found in pine oils (tall oil fatty acids), rapeseed oil, corn oil, sunflower oil, soybean oil, rapeseed oil, flax oil, jojoba oil and castor oil, and also eicosapentaenoic acid and docosahexaenoic acid which are found in fish oils.

Compound (A) may be a mixture of fatty acid trimer and of diacids chosen from a linear alkyldicarboxylic acid such as glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid or octadecanedioic acid, or branched such as 3,3-dimethylglutaric acid.

Advantageously, compound (A) is a mixture comprising 15% to 100% of fatty acid dimers, the remainder consisting of monomers and/or trimers and/or oligomers of higher fatty acids.

Examples of fatty acid dimers and trimers that may be mentioned include the compounds having the following formulae, which illustrate cyclic timers and dimers derived from fatty acids containing 18 carbon atoms, given that the commercially available compounds are mixtures of steric isomers and of positional isomers of these structures, optionally partially or totally hydrogenated.

Use may also be made of a mixture of fatty acid oligomers containing dimers, trimers, higher oligomers and linear or cyclic C18 fatty acid monomers, said mixture being predominantly dimers and trimers and containing a small percentage (usually less than 5%) of monomers and of higher oligomers. Advantageously, said mixture comprises:
- 0% to 40% by weight, advantageously 0.1% to 5% by weight, of identical or different fatty acid monomers,
- 0% to 10% by weight, advantageously 0% to 1% by weight, of identical or different higher fatty acid oligomers,
- 0.1% to 99% by weight, advantageously 15% to 95% by weight, of identical or different fatty acid dimers, and
- 0.1% to 90% by weight, advantageously 5% to 85% by weight, of identical or different fatty acid trimers.

Even more advantageously, said mixture of molecules derived from fatty acids has an average molecular mass of greater than 500 g/mol.

Examples of fatty acid dimers/trimers mixtures that may be mentioned include (% by weight):
- Pripol® 1017 from Uniqema, mixture of 75-80% dimers and 18-22% trimers with about 1-3% fatty acid monomers,
- Pripol® 1048 from Uniqema, 50/50% mixture of dimers/trimers,
- Pripol® 1013 from Uniqema, mixture of 95-98% dimers and 2-4% trimers with 0.2% maximum of fatty acid monomers,
- Pripol® 1006 from Uniqema, mixture of 92-98% dimers with a maximum of 4% trimers with 0.4% maximum fatty acid monomers,
- Pripol® 1040 from Uniqema, mixture of fatty acid dimers and trimers with at least 75% trimers and less than 1% fatty acid monomers,
- Unidyme® 60 from Arizona Chemicals, mixture of 33% dimers and 67% trimers with less than 1% fatty acid monomers,
- Unidyme® 40 from Arizona Chemicals, mixture of 65% dimers and 35% trimers with less than 1% fatty acid monomers,
- Unidyme® 14 from Arizona Chemicals, mixture of 94% dimers and less than 5% trimers and other higher oligomers with about 1% fatty acid monomers,

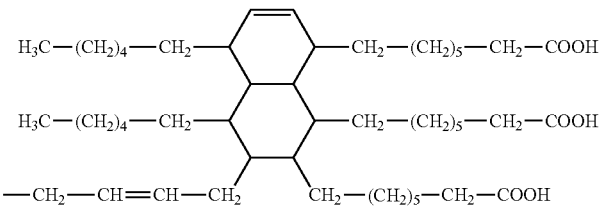

Cyclic Trimer of C18 Acid

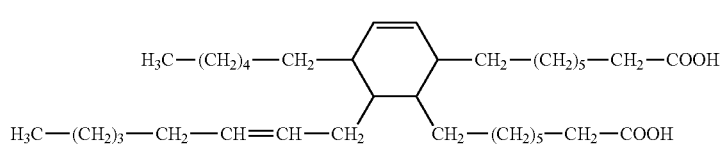

Cyclic Dimer of C18 Acid

Empol® 1008 from Cognis, mixture of 92% dimers and of 3% higher oligomers, including essentially trimers, with about 5% fatty acid monomers, Empol® 1018 from Cognis, mixture of 81% dimers and 14% higher oligomers, including essentially trimers, with about 5% fatty acid monomers, Radiacid® 0980 from Oleon, mixture of dimers and trimers with at least 70% trimers, Radiacid® 0950 from Oleon, mixture of 79-85% fatty acid dimers and 13-19% fatty acid trimers with about 1-3% fatty acid monomers.

The products Pripol®, Unidyme®, Empol® and Radiacid® comprise C18 fatty acid monomers and fatty acid oligomers corresponding to C18 multiples.

According to one particular embodiment, the mixture of dicarboxylic and tricarboxylic acid may be partially or totally replaced with a diacid and triacid derivative, this derivate being chosen from an acid salt, an acid ester and an acid chloride.

Examples of esters that may be mentioned include a methyl, ethyl or isopropyl ester of a fatty acid as defined above.

A preferred fatty acid ester is a methyl ester of a fatty acid, and in particular a methyl ester of a fatty acid dimer or of a mixture of fatty acid oligomers as defined below.

An example of a fatty acid chloride that may be mentioned is sebacoyl chloride.

For its part, compound (B) bears at least one reactive group that may be chosen especially from primary or secondary amine and alcohol groups. As a variant, compound (B) may bear at least two such identical or different groups. It is preferred according to the invention for compound (B) to bear at least one primary amine function.

In the case especially in which the reactive group of compound (B) is capable of reacting with the first functions of compound (A), without any additional reaction step, it is preferred that, in this single reaction step of the process, the ratio of the number of reactive groups of compound (B) to the sum of the functions of compound (A) ranges from 0.05 to 1.10 and advantageously from 0.15 to 1.

In one particular embodiment, the supramolecular polymer may be obtained via an additional reaction with at least one at least bifunctional compound (C) whose functions are capable of reacting with the second functions of compound (A) to form ester, thioester or amide bridges when said second functions of compound (A) have not reacted with compound (B).

In the case where the reactive group of compound (B) can react with the first functions of compound (A), while leaving free second functions of compound (A) for additional reaction steps, for example with (C), it is preferred that, in the first step of the process, the ratio of the number of reactive groups of compound (B) to the sum of the functions of compound (A) ranges from 0.05 to 0.8 and advantageously from 0.15 to 0.7.

Compound (B) may thus correspond to any one of the formulae (B1) to (B5):

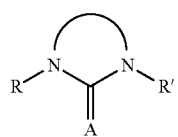
(B1)

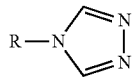
(B2)

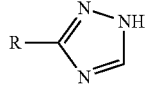
(B3)

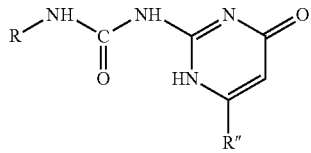
(B4)

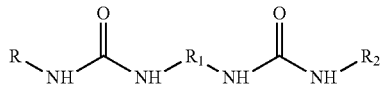
(B5)

in which:

R denotes a unit containing at least one reactive function,

R' denotes a hydrogen atom,

R", R1 and R2 denote any groups, especially a C1-C50 alkyl group,

A denotes an oxygen or sulfur atom or a group NH, advantageously an oxygen atom.

Preferred examples of compounds (B) are 2-aminoethylimidazolidone (UDETA), 1-(2-hydroxyethyl)imidazolidone [HEIO], 1-(2-[(2-aminoethyl)amino]ethyl)imidazolidone (UTETA), 1-(2-{2-[(2-aminoethylamino]ethyl}amino) ethyl]imidazolidone (UTEPA), N-(6-aminohexyl)-N'-(6-methyl-4-oxo-1,4-dihydropyrimidin-2-yl)urea (UPy), and N-(6-aminobutyl)-N'-(6-methyl-4-oxo-1,4-dihydropyrimidin-2-yl)urea, 3-amino-1,2,4-triazole and 4-amino-1,2,4-triazole. UDETA is preferred for use in the present invention.

Some of these compounds may be obtained by reacting urea with a polyamine. For example, UDETA, UTETA and UTEPA may be prepared, respectively, by reacting urea with diethylenetriamine (DETA), triethylenetetramine (TETA) and tetraethylenepentamine (TEPA). The compound HEIO may be obtained by reacting urea with the corresponding diamino alcohol, mainly 2-[(2-aminoethyl)amino]ethanol.

The reaction of compound (B) with compound (A) may be performed, for example, at a temperature of between 20 and 200° C. and advantageously between 130 and 170° C., for a time ranging from 1 to 15 hours, for example from 3 to 9 hours, advantageously with stirring and under an inert atmosphere.

The product resulting from the reaction of compounds (A) and (B) may be used directly as plasticizer according to the invention. Alternatively, and in particular when compound (B) has reacted only with the first functions of (A), the compound resulting from the first reaction step (A)+(B) may be reacted with compound (C) in a second step involving the two functions of compound (A).

The compound resulting from the first reaction step, (A)+(B) may then be reacted with an at least bifunctional compound (C), such that the functions of (C) react with the second functions, i.e. the remaining reactive functions, of compound (A). It will be avoided in this step to employ catalytic conditions liable to lead to homopolymerization of compound (C).

Compound (C) bears at least two identical or different functions, chosen especially from epoxy, alcohol and amine functions.

Compound (C) may be a diepoxide. It may thus be chosen from: bisphenol A diglycidyl ether, bisphenol F diglycidyl ether, tetrabromobisphenol A diglycidyl ether, or hydroquinone diglycidyl ether, ethylene glycol diglycidyl ether, propylene glycol diglycidyl ether, butylene glycol diglycidyl ether, neopentyl glycol diglycidyl ether, 1,4-butanediol diglycidyl ether, 1,6-hexanediol diglycidyl ether, cyclohexanedimethanol diglycidyl ether, polyethylene glycol diglycidyl ether, polypropylene glycol diglycidyl ether, polytetramethylene glycol diglycidyl ether, resorcinol diglycidyl ether, neopentyl glycol diglycidyl ether, bisphenol A polyethylene glycol diglycidyl ether, bisphenol A polypropylene glycol diglycidyl ether, terephthalic acid diglycidyl ester, epoxidized polyunsaturated fatty acids, and limonene epoxide; and mixtures thereof.

As a variant, compound (C) may be a polyepoxide containing at least three epoxide functions, chosen, for example, from: castor oil triglycidyl ether, 1,1,1-tris-(hydroxymethyl) propane triglycidyl ether, trisphenol triglycidyl ether, glyceryl triglycidyl ether, glyceryl propoxylate triglycidyl ether, glyceryl ethoxylate triglycidyl ether, trimethylolpropane triglycidyl ether, sorbitol polyglycidyl ether, polyglyceryl polyglycidyl ether, pentaerythritol polyglycidyl ether, poly(glycidyl acrylate), polyglycidyl methacrylate, epoxidized polyunsaturated fatty acids, epoxidized plant oils, epoxidized fish oils and limonene epoxide.

As a further variant, compound (C) may be a diol. In this case, compound (C) may be chosen from: ethylene glycol, propylene glycol, tetramethylene glycol, hexamethylene glycol, octanediol, nonanediol, decanediol, diethylene glycol, dipropylene glycol, triethylene glycol, tetraethylene glycol, polyethylene glycol, polypropylene glycol, polytetramethylene glycol, polyesters bearing hydroxyl end groups, polybutadienes bearing hydroxyl end groups, polydimethylsiloxanes bearing hydroxyl end groups, polyisobutylenes bearing hydroxyl end groups, polybutadiene-co-acrylonitrile copolymers bearing hydroxyl end groups, diol dimers derived from fatty acids, and mixtures thereof.

According to another possibility, compound (C) may be a polyol containing at least three alcohol functions. Examples of such compounds are especially: sugars such as sorbitol, pentaerythritol, trimethylolpropane, and also glycerol and ethoxylated and propoxylated derivatives thereof, castor oil and diol dimers derived from fatty acids such as Pripol® 2033 from Uniqema.

According to another possibility, compound (C) may be a polyamine. The polyamine may be any compound bearing at least two amine functions, advantageously primary amine functions, and advantageously a compound of formula (I):

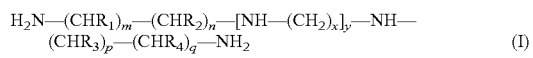

$H_2N—(CHR_1)_m—(CHR_2)_n—[NH—(CH_2)_x]_y—NH—(CHR_3)_p—(CHR_4)_q—NH_2$    (I)

in which:
R1, R2, R3 and R4 independently denote a hydrogen atom or a C 1-C6 alkyl group such as a methyl group,
m, n, p and q independently denote an integer ranging from 1 to 3,
x denotes an integer ranging from 1 to 6,
y denotes a integer ranging from 0 to 2.

In formula (I) above, at least one and advantageously all of the conditions below are satisfied:
R1, R2, R3 and R4 denote a hydrogen atom,
m+n is equal to 2, 3 or 6, advantageously 2,
p+q is equal to 2, 3 or 6, advantageously 2,
x denotes an integer ranging from 2 to 4,
y is equal to 0 or 1, advantageously 0.

Preferred examples of polyamines of formula (I) are DETA (diethylenetriamine), TETA (triethylenetetramine), TEPA (tetraethylenepentamine) and dihexylenetriamine.

As a variant, the polyamine may be a linear alkylenediamine containing 3 to 40 carbon atoms, such as cadaverine, putrescine, hexamethylenediamine or 1,12-diaminododecane or a cyclic alkylenediamine such as isophorone diamine.

As a variant, the polyamine may be a di- or triamine derived from fatty acid dimers and trimers of plant origin, such as Versamine® 551 from Cognis.

The reaction of the polyamine (compound (C)) with the second functions of the product resulting from a first reaction step (A)+(B), the functions corresponding as described previously to carboxylic acids or salt, ester or acid chloride derivatives thereof, may be performed, for example, at a temperature of between 20 and 200° C., advantageously between 140 and 180° C., for a time ranging from 1 to 24 hours, for example from 6 to 8 hours, advantageously with stirring and under an inert atmosphere.

According to one preferred embodiment, all of the functions of compound (A) remaining after the first reaction step which engaged the first functions of (A) with reactive functions of compound (B) is reacted in stoichiometric proportion with the reactive functions of compound (C).

The supramolecular polymer used in the uses of the invention is derived from the reaction of compound (A) with compound (B) and optionally with compound (C). These reactions may be performed simultaneously or successively. In the case where these reactions are performed successively, the reaction of compound (A) with compound (B) will advantageously be performed first, though the reverse order is also possible. They may also be performed either in separate reactors or in the same reactor, without it being necessary to envisage a washing or purification step after the first of these reactions.

In one particular embodiment, the supramolecular polymer defined above is reacted with urea.

Thus, advantageously, the product resulting from the reaction of at least one compound (A) with at least one compound (B) and at least one compound (C) is reacted with urea to constitute di(amidoethyl)urea, diamidotetraethyl triurea and/or urea junctions.

The reaction may be performed, for example, at a temperature from 110 to 180° C., advantageously from 120 to 160° C., by applying a temperature ramp, over a time ranging from 30 minutes to 24 hours and advantageously over a time of 1 to 6 hours, under an inert atmosphere and advantageously with stirring. This reaction may also be performed at a fixed temperature of between 110 and 160° C. for a fixed time ranging from 10 minutes to 24 hours. In this case also, this reaction may be performed in a reactor separate from that or those used in the proceeding step(s), or in the same reactor. It is thus understood that all the steps in the process for obtaining the supramolecular polymer may be performed in the same reactor, by successive addition of the reagents, which makes the process particularly simple and economical.

Urea has the function, in this step, of creating additional associative groups, for example according to the following reaction schemes:

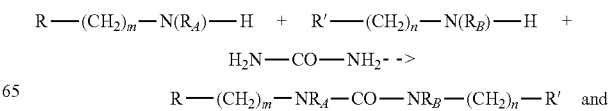

$R—(CH_2)_m—N(R_A)—H \; + \; R'—(CH_2)_n—N(R_B)—H \; +$ $H_2N—CO—NH_2 \text{-->}$ $R—(CH_2)_m—NR_A—CO—NR_B—(CH_2)_n—R' \quad \text{and}$ -continued

 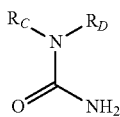

Compounds (A), (B) and (C) described previously may be used in molten form, in pulverulent or non-pulverulent solid form or via a liquid route, for example in aqueous solution or dispersion. It is preferred, however, for them to be introduced in pulverulent solid form or in molten form to avoid the use of solvents that need to be removed subsequently.

Then the process for obtaining the supramolecular polymer comprises a final step of reaction with urea, thus in addition to the reactions of (A) with (B) and (C), it is preferred for compound (C) to be a polyamine as described above, and it is particularly preferred for compound (C) to be diethylenetriamine or DETA.

The proportions of (A), (B) and (C) used in the process for synthesizing the supramolecular polymer, and the nature thereof, and the choice of performing or not performing an additional reaction step with urea, determine the mechanical characteristics of said supramolecular polymer. Thus, it is possible to obtain mechanical properties ranging from those of an elastomer to those of a plastomer. These parameters also determine the solubility properties of said polymer. Thus, it is possible for the supramolecular polymer to be totally or partially soluble in polar solvents such as alcohols.

According to one embodiment of the invention, the mean number of associative groups per molecule is at least 1.2, advantageously at least 2 or even at least 2.2.

Similarly supramolecular polymers defined above are materials in the form of soft solids, which it is necessary to extract from the reactor which has been used for their synthesis. According to one preferred variant, the product may be extracted from the reactor in liquid and "finished" form via a heat treatment in suitable equipment or a suitable container optionally comprising mobile parts such as a stove, oven, heating bands, mixer, extruder or calendaring machine, up to its transformation as a soft solid. The supramolecular polymer may be chopped or ground, especially without heating, for example in a hammer mill, a ball mill, a ball crusher, a grinding mill or a knife mill, and then washed, for example with water, and optionally put in form, especially by hot pressing, calendaring, hot forming or any other method.

Coplasticization

The molecule bearing associative groups defined above may be used in combination with a common plasticizer chosen from adipates, for instance diethyl adipate, bis(2-ethylhexyl)adipate, dimethoxyethyl adipate, azelates, for instance dicyclohexyl azelate, bis(2-ethylhexyl) azelate, diisobutyl azelate, sebacates, for instance dimethyl sebacate, dibutyl sebacate, diisooctyl sebacate, phthalates, for instance dimethyl phthalate, dibutyl phthalate, bis(2-ethylhexyl) phthalate, diisooctyl phthalate, diisononyl phthalate, trimellitates, for instance trioctyl trimellitate, trinonyl trimellitate, triisodecyl trimellitate, tris(2-ethylhexyl) trimellitate, phosphates, for instance triethyl phosphate, triphenyl phosphate, tricresyl phosphate, citrates, for instance triethyl citrate, tris(2-ethylhexyl) citrate, benzenesulfonamide derivatives, for instance butylbenzenesulfonamide and hydroxypropylbenzenesulfonamide, glycolic esters, for instance ethylene glycol dibutyrate, glyceryl diacetate, glyceryl triacetate, diethylene glycol dipropionate, epoxidized soybean oil, epoxidized flax and epoxidized pine oil (or tall oil) fatty acids.

The molecule bearing associative groups defined above may also be used in combination with other common additives in polymer formulations, for instance heat stabilizers and UV stabilizers, fillers, dyes, pigments and optical modifiers such as optical brighteners.

The invention will be understood more clearly in the light of the examples that follow, which are given purely for illustrative purposes and which do not have the aim of limiting the scope of the invention, defined by the attached claims.

EXAMPLES

Example 1

Preparation of a Supramolecular Polymer

In a glass reactor equipped with a variable-speed stirring motor, inlets for introducing reagents, for introducing inert gases, such as nitrogen, and for measuring probes (e.g. temperature), a condensation/vapor extraction system which may be connected to a vacuum system (vacuum pump, traps, etc.), and a jacket for heating/cooling the contents of the reactor by means of circulation therein of a heat-exchange fluid, such as oil originating from a thermostatic bath, 145 g of acid dimer/trimer Pripol® 1017 with an acid number (mg KOH/g of product necessary to neutralize the acid groups) of 193.4 are introduced and the system is heated to 60-80° C. with stirring. 161 g of 2-aminoethylimidazolidinone (UDETA) at a purity of about 88 mol %, preheated (to about 60° C.) and homogenized by stirring, are then introduced slowly. The reaction medium is then brought to 160° C. so as to bring about the amine (of the UDETA)-acid (of the fatty acid dimer/trimer mixture reaction) while extracting the water of condensation, especially by means of flushing the headspace of the reactor with nitrogen. The reaction is left to continue for 16 hours, after which the reaction medium is cooled. The supramolecular polymer "SC" is then obtained. The solidification point of the polymer SC is detected at 61° C. and the residual acid number obtained is 1.49. The polymer is also characterized by a Tg of from −15 to −10° C., determined using a DSC Q10 machine sold by TA Instruments.

In the rest of the description, the term "SC polymer" denotes the product synthesized in example 1.

Example 2

Preparation of a Semicrystalline "Ester" Supramolecular Polymer

In a 1-liter jacketed glass Schott reactor, equipped with a mechanical stirring (paddle), a temperature probe, an addition funnel, a nitrogen inlet and Dean-Stark apparatus on which is mounted a condenser, are placed 311 g of Pripol® 1017 (supplier: Croda, 1.07 mol of COOH functions) and 1.6 g of methanesulfonic acid (supplier: ARKEMA). The mixture is heated to 50° C., followed by addition, via the addition funnel, of 139.5 g of HEIO (Norsocryl® 101, supplier: ARKEMA, 1.07 mol). The mixture is heated at 160-165° C. for 10 hours. 10 g of water are recovered in the Dean-Stark apparatus. The mixture is left to cool, and 436 g of semicrystalline "ester" supramolecular polymer are obtained.

Example 3

Study of the Plasticization of Polyamides with the SC Polymer

The mixtures defined in table 1 below were prepared on a DSM® brand twin-screw microextruder with a capacity of 15 cm³. The temperature is set at 210° C. (the temperature measured in the extruder is about 200° C.). The speed of the screws is 100 rpm and the mixing lasts for 2 minutes while flushing with nitrogen. At the extruder outlet, tensile specimens are molded with a DSM® brand mini-injection press. The sheath temperature is set at 210° C., the mold temperature is set at 50° C. and the pressure is maintained for 15 seconds.

TABLE 1

Mixtures prepared

| Component | BMNO | BMNO P10 | BMNO P20 | BMNO/SC polymer | BMNO/SC polymer/BBSA |
|---|---|---|---|---|---|
| BMNO | 100 | 96 | 92 | 92 | 88.5 |
| BBSA |  | 4 | 8 |  | 4 |
| SC polymer |  |  |  | 8 | 7.5 |

The contents indicated are the contents introduced into the machine: it is possible that slight differences exist with the composition of the final product, these small differences not affecting the results. For an "extrusion", 4 to 5 specimens may be injected.

The polyamide used is a BMNO (Polyamide 11 sold by ARKEMA under the name Rilsan® BMNO). The SC polymer product is that synthesized in example 1. BBSA (butylbenzenesulfonamide) is a plasticizer sold by Proviron and used conventionally in polyamides.

Demonstration of the Plasticization:

Analyses were performed using a DMA® 2980 machine from TA Instruments on the specimens prepared previously, by applying a heating plate of 3° C./min and a frequency of 1 Hz.

The maximum of the modulus E" was recorded for the various spectra, which are summarized in table 2 below.

TABLE 2

| Product | BMNO | BMNO P10 | BMNO P20 | BMNO/SC polymer | BMNO/SC polymer/BBSA |
|---|---|---|---|---|---|
| Temperature at the maximum of E" (° C.) | 55 | 41.5 | 31 | 45.5 | 33.5 |

It is observed that the product with 8% of SC polymer plasticizes but to a lesser extent than 8% of BBSA, the effect is rather close to that obtained with 4% of BBSA. It is observed that the mixtures with 4% of BBSA and 8% of SC polymer have similar behavior to a polyamide 11 plasticized with 8% of BBSA.

Tensile tests were also conducted according to standard ISO 527 1 BA, and the tensile moduli at room temperature for the various mixtures are given in table 3 below.

TABLE 3

|  | BMNO | BMNO P10 | BMNO P20 | BMNO/SC polymer | BMNO/SC polymer/BBSA |
|---|---|---|---|---|---|
| Tensile modulus at 23° C. (MPa) | n = 3 | n = 3 | n = 3 | n = 3 | n = 3 |
|  | 985 | 517 | 362 | 640 | 401 |
|  | 876 | 512 | 350 | 632 | 358 |
|  | 906 | 526 | 384 | 602 | 413 |
|  | 922 s = 56 | 518 s = 7 | 365 s = 17 | 625 s = 20 | 391 s = 29 |

It is observed that the mixture with 8% of SC polymer is more rigid than that with 8% of BBSA, while at the same time being much less rigid than the original polyamide 11. It is observed that a mixture with 8% of SC polymer and 4% of BBSA has properties similar to a mixture with 8% of BBSA.

Demonstration of the Reduced Migration into the Atmosphere (Volatility) and into a Liquid:

a) A first evaluation of the migration into the atmosphere (volatility) of plasticizers was formed using an isothermal measurement by TGA at 230° C. under nitrogen. The machine used is a TG 209F1 machine sold by Netzsch. After 2 hours, equilibrium is reached and the loss of mass for each plasticized polyamide is:

3% for P10 (75% BBSA introduced)

6% for P20 (75% BBSA introduced)

4.5% for the SC polymer/BBSA (40% of plasticizers introduced)

It is observed that the loss of mass is lower in the mixtures with SC polymer, and this product thus remains more plasticized than those based only on BBSA after extraction.

b) Extraction tests (volatility) were also conducted in a vacuum oven at 150° C. for 150 hours. The equilibrium loss of mass is reached after about 215 hours for BMNO and the BMNO/SC polymer, for BMNO P20 a slight loss of mass continues between 215 and 385 hours, and then no longer changes. The final losses of mass are collated in table 4 below.

TABLE 4

| Product | BMNO | BMNO P20 | BMNO/SC polymer |
|---|---|---|---|
| Loss of mass | 1.9% | 1.8% | 8.3% |

A large part of the BBSA is extracted, whereas very little SC polymer is, and the loss of mass is otherwise the same as for polyamide 11 alone. In both cases, the loss of 2% by mass corresponds to a loss of water initially present in the polymer.

c) Extraction tests (migration into a liquid) were also conducted in CM15 (spirit) at 100° C. for 165 hours and in RME30 (diesel) at 140° C. for 1000 hours.

In CM15, the swelling increased rapidly over the first 20 hours, then changed much more gently, to be stable after about 100 hours. The increases in mass at the end of the test are presented in table 5 below.

TABLE 5

| Product | BMNO | BMNO P20 | BMNO/SC polymer |
|---|---|---|---|
| Increase in mass | 23.5% | 16% | 20% |

BMNO absorbs spirit, which causes its mass to increase. The product with BBSA swells by 7% less, which is due to the loss of BBSA. The mixture with SC polymer swells by 4% less than BMNO alone, which is again proof that the SC polymer is less extracted than BBSA, but this time in a spirit.

The aging in diesel begins with a loss of mass over the first 200 hours for BMNO P20, whereas the mass increases for BMNO and BMNO/SC polymer, and then the mass of all the products increases linearly and in a comparable manner. The test is stopped after 1000 hours. The increases in mass at the end of the test are presented in table 6 below.

TABLE 6

| Product | BMNO | BMNO P20 | BMNO/SC polymer |
|---|---|---|---|
| Increase in mass | 3.8% | −2% | 4.9% |

In this case also, polyamide 11 is swollen with solvent, and the mixtures with BBSA lose mass because this plasticizer is extracted, in contrast with the SC polymer, which is not at all extracted into this solvent.

II— A Second Series of Mixtures was Prepared

BMNO+SC polymer mixtures in mass proportions of 70/30 are prepared using a Brabender® brand internal mixer with a capacity of 50 cm3. This mixture containing 30% SC is referred to as "concentrated". The stirring speed is set at 60 rpm for 4 minutes, and the temperature is set at 240° C. The products are then ground in order to be introduced into an extruder.

The mixtures with BBSA and SC polymer are prepared using a Haake® brand two-screw extruder. The SC polymer is introduced via the concentrate prepared beforehand. The compositions of the mixtures and the conditions used are indicated in table 7 below.

TABLE 7

| Name of the product | BMNO | BBSA | SC | Screw speed | Flow rate of the granule meters | BBSA injection rate |
|---|---|---|---|---|---|---|
| BMNO | 100 | | | 250 rpm | 2 kg/h | |
| BMNO + SC | 88 | | 12 | 250 rpm | 2 kg/h | |
| BMNO + BBSA | 92 | 8 | | 180 rpm | 1.6 kg/h | 60 g/h |
| BMNO + SC/BBSA | 88 | 4 | 8 | 170 rpm | 1.2 kg/h | 95 g/h |

The temperature profile applied to the BMNO, BMNO+SC polymer, BMNO+SC polymer/BBSA mixtures is 150° C.-220° C.-230° C.-230° C.-230° C.

The temperature profile applied to the BMNO+BBSA mixture is 170° C.-240° C.-230° C.-230° C.-230° C.

Dumbbells are then injected with these formulations according to standard ISO 527 1BA.

DMA tests similar to those performed in the preceding example are conducted, and very similar behavior is again observed between the mixture BMNO+8% BBSA and the mixture BMNO+8% SC polymer SC+4% BBSA.

Demonstration of the Reduced Migration into the Atmosphere (Volatility) and into a Liquid a) A TGA measurement in nitrogen with a heating rate of 10° C./min is conducted. The loss of mass at 320° C. is measured. The results given in table 8 below are obtained.

TABLE 8

| Name of the product | Loss of mass at 320° C. |
|---|---|
| BMNO | −1.2% |
| BMNO + SC | −1.2% |
| BMNO + BBSA | −7.1% |
| BMNO + SC + BBSA | −4.5% |

It is observed that the SC polymer alone is not extracted. The loss is in fact equivalent to that of BMNO alone, due to a loss of water. In the case of the SC/BBSA mixture, the loss corresponds to the amount of BBSA introduced.

b) Aging operations in water (reference: Volvic water) were performed for 1 week at 140° C. The headspace of the autoclaves is rendered inert with nitrogen. The change in mass after 7 days is indicated in table 9 below.

TABLE 9

| Aging in Volvic water | Mass variation |
|---|---|
| BMNO | 3% |
| BMNO + SC | 5.1% |
| BMNO + BBSA + SC | 0.8% |
| BMNO + BBSA | −5.4% |

It is observed the SC polymer is only very slightly extracted into the mixture, whereas virtually all of the BBSA is.

Study of the Plasticization in Formulation of a Rubber with the SC Polymer

Formulations gassed on polyisoprene (commercial reference Natsyn® 2200) are prepared in a Brabender® W350 S internal mixer, equipped with "Bambury" rotors spinning at 50 revolutions per minute and starting from room temperature (20-25° C.) according to the composition tables 10 and 11 below.

TABLE 10

| Peroxide formulation | | |
|---|---|---|
| Ingredient | Parts by weight | Mass (in grams) |
| Natsyn ® 2200 | 100 | 255.85 |
| Carbon black | 20 | 51.17 |
| Antioxidant | 2 | 5.12 |
| Dicumyl peroxide Luperox ® DC (from ARKEMA) | 0.35 | 0.9 |

The antioxidant is a polymerized 1,2-dihydro-2,2,4-trimethylquinoline.

TABLE 11

| Peroxide formulation with SC polymer | | |
|---|---|---|
| Ingredient | Parts by weight | Mass (in grams) |
| Natsyn ® 2200 | 100 | 238.1 |
| Carbon black | 20 | 47.62 |
| Antioxidant | 2 | 4.76 |
| Dicumyl peroxide Luperox ® DC (from ARKEMA) | 0.35 | 0.83 |
| SC polymer of example 1 | 10 | 23.81 |

The antioxidant is a polymerized 1,2-dihydro-2,2,4-trimethylquinoline.

The ingredients are added to the mixer in the following order:
  incorporation of the polyisoprene, and then
  incorporation of the carbon black,
  incorporation of the TMQ and of the SC polymer (where appropriate), and finally
  incorporation of the peroxide crosslinking agent.

The mixer is left rotating until the torque has stabilized after introduction of all the components.

The formulations obtained are placed in a calander until a cake is obtained and are then crosslinked in a press at 175° C. for 8 minutes.

Specimens are then chopped out of the plates and the mechanical properties are measured using an Instron® tensile testing machine at 500 mm/min in a room at a controlled temperature of 22-24° C. and a controlled humidity of 40-60%.

As shown in table 12 below, the SC polymer has a plasticizing effect reflected by an increase in the elongation at break.

TABLE 12

| Formulation | Breaking strain | Elongation at break | Initial modulus |
|---|---|---|---|
| Peroxide (table 6) | 2.4 | 650 | 0.6 |
| Peroxide with SC polymer (table 7) | 2.6 | 784 | 0.6 |

The invention claimed is:

1. A method of plasticizing a plastic, comprising:
adding a plasticizer to the plastic, wherein the plasticizer comprises a molecule with an average molecular mass of greater than 500 g/mol, wherein the molecule comprises at least one associative group comprising a nitrogenous heterocycle;
wherein the molecule comprising at least one associative group is a supramolecular polymer obtained by reacting at least one compound A with at least one compound B;
wherein compound A comprises a mixture of fatty acid trimer and a linear or branched alkyldicarboxylic acid is selected from the group consisting of glutaric acid, adipic acid, pimelic acid, suberic acid, azelaic acid, sebacic acid, undecanedioic acid, dodecanedioic acid, brassylic acid, tetradecanedioic acid, pentadecanedioic acid, thapsic acid, octadecanedioic acid, and 3,3-dimethylglutaric acid;
wherein compound B is selected from the group consisting of a compound of formulae (B1) to (B4):

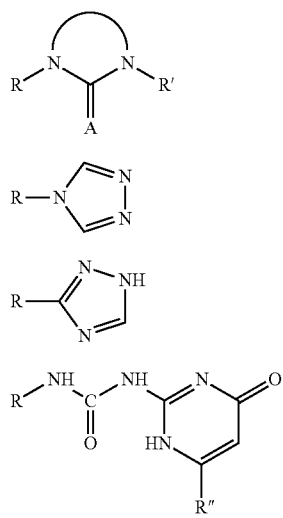

wherein:
R is a unit comprising at least one reactive function;
R' is a hydrogen atom;
R", $R_1$ and $R_2$ are chosen from a $C_1$ to $C_{50}$ alkyl group; and
A is chosen from an oxygen atom, a sulfur atom, and a NH group.

2. The method of claim 1, wherein the supramolecular polymer obtained by the reaction of compound A with compound B is further reacted with at least one compound C;
wherein compound C comprises at least a first functional group and a second functional group;
wherein the first functional group and second functional group of compound C are capable of reacting with the second functional group of compound A to form ester, thioester, or amide bridges, when the second functional group of compound A has not reacted with compound B.

3. The method of claim 1, wherein the supramolecular polymer is capable of reacting with urea.

4. The method of claim 1, wherein compound B is selected from the group consisting of 2-aminoethylimidazolione, 1-(2-[(2-aminoethyl)amino]ethyl)imidazolidone, 1-(2-{2-[(2-aminoethylamino]ethyl}amino)ethyl]imidazolidone.

5. The method of claim 2, wherein the first functional group and the second functional group of compound C are identical or different functional groups, and are selected from the group consisting of epoxy, alcohol and amine functional groups.

6. The method of claim 5, wherein compound C is selected from the group consisting of a compound of formula (I):

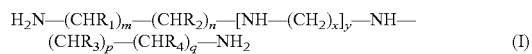

wherein:
$R_1$, $R_2$, $R_3$ and $R_4$ are independently chosen from a hydrogen atom or a $C_1$-$C_6$ alkyl group;
m, n, p and q are independently chosen integers ranging from 1 to 3;
x is an integer ranging from 1 to 6; and
y is an integer ranging from 0 to 2.

7. The method of claim 6, wherein compound C is selected from the group consisting of a compound of formula (I) satisfying at least one of the following conditions:
$R_1$, $R_2$, $R_3$ and $R_4$ are hydrogen atoms;
m+n is equal to 2, 3 or 6;
p+q is equal to 2, 3 or 6;
x is an integer ranging from 2 to 4; or
y is equal to 0 or 1.

8. The method of claim 6, wherein compound C is selected from the group consisting of DETA (diethylenetriamine), TETA (triethylenetetramine), TEPA (tetraethylenepentamine), and dihexylenetriamine.

9. The method of claim 1, wherein the plastic is selected from the group consisting of cellulose derivatives, polyamides, polymers consisting of monomers obtained by reaction of a $C_6$-$C_{14}$ aliphatic, cycloaliphatic or aromatic dicarboxylic acid with a $C_6$-$C_{22}$ aliphatic, cycloaliphatic, arylaliphatic or aromatic diamine, acrylic homopolymers and copolymers, polycarbonate, styrene polymers, halogenated vinyl polymers, polyethers and polymers of plant or bacterial origin, polyvinyl acetate, polyvinyl butyral, elastomers, polybutadiene, synthetic polyisoprene, optionally hydrogenated polychloroprene, polyisobutylene and copolymers containing polybutadiene and isoprene blocks with styrene, which are optionally hydrogenated, hydrogenated SBS, poly (styrene-b-butadiene-b-methyl methacrylate), optionally hydrogenated, poly(methyl methacrylate-b-butyl acrylate-b-methyl methacrylate), poly(styrene-b-butyl acrylate-b-styrene), statistical copolymers of butadiene with styrene and acrylonitrile, which are optionally hydrogenated, butyl or halogenated rubbers, polyethylenes, polypropylenes, silicone elastomers of general formula —(Si(R)(CH$_3$)O)$_n$— wherein CH$_3$ and R are linked to the silicon atom and the silicon atom is linked to the oxygen atom, and R is chosen from methyl, phenyl, vinyl, trifluoropropyl, and 2-cyanoethyl radicals, ethylene-vinyl alcohol copolymers, ethylene-propylene and ethylene-propylene-diene copolymers, copolymers of ethylene with acrylic and vinyl monomers, resins based on methacrylic esters, polyamide/polyether multiblock copolymers, elastomers based on polyesters and polyurethane, recycled rubbers based on thermoplastic elastomers or based on recycled crosslinked rubber, and mixtures thereof.

10. The method of claim 9, wherein the plastic is selected from the group consisting of poly(lactic acid), polyhydroxyalkanoates, natural rubber, poly(styrene-b-butadiene), poly(styrene-b-butadiene-b-styrene), poly(styrene-b-isoprene-b-styrene, poly(styrene-b-(isoprene-stat-butadiene)-b-styrene, poly(styrene-b-isoprene-b-butadiene-b-styrene), copolymers of ethylene and vinyl acetate, copolymers of ethylene, vinyl acetate and maleic anhydride, copolymers of ethylene and acrylic ester, copolymers of ethylene, acrylic ester and maleic anhydride, copolymers of ethylene, acrylic ester and functional acrylic ester, copolymers of ethylene, acrylic ester and glycidyl acrylate, and copolymers of ethylene, acrylic ester and glycidyl methacrylate.

* * * * *